Figure 1:
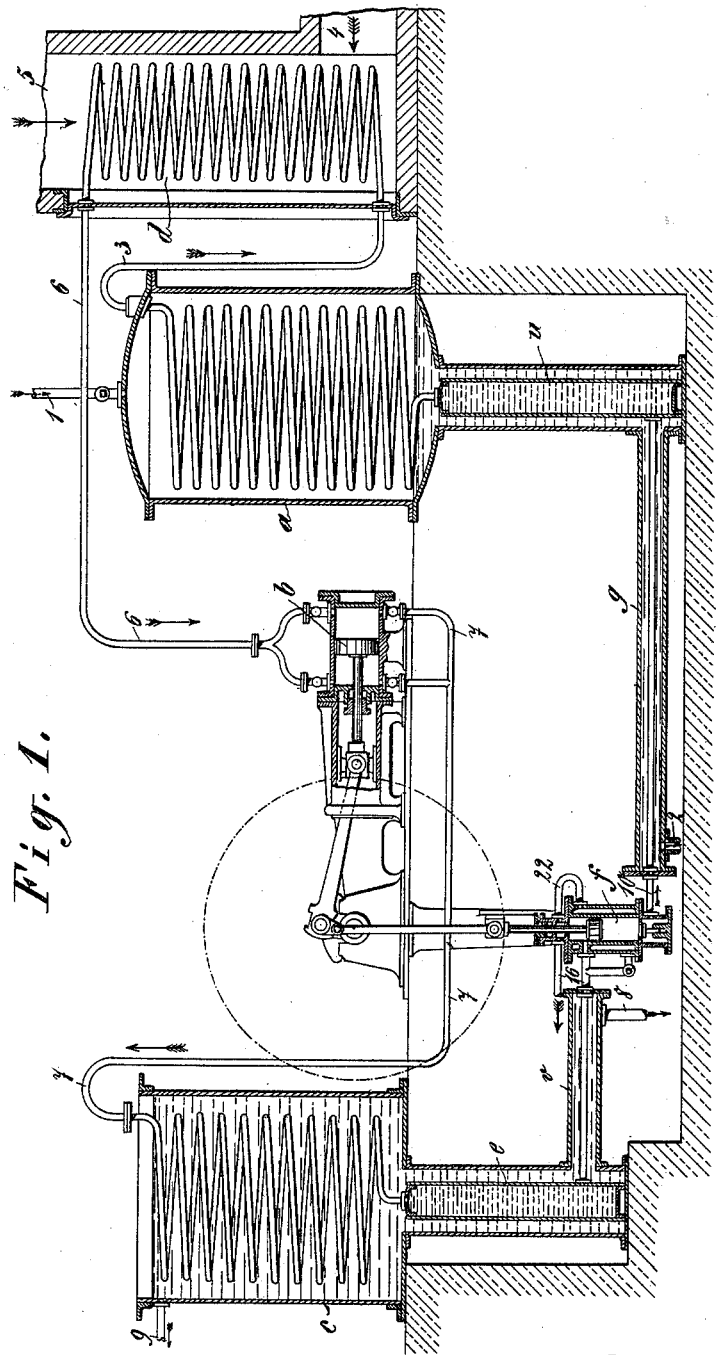

No. 670,829. Patented Mar. 26, 1901.
F. WINDHAUSEN, Jr.
GENERATOR.
(Application filed May 12, 1900.)
(No Model.) 2 Sheets—Sheet 1.

No. 670,829. Patented Mar. 26, 1901.
F. WINDHAUSEN, JR.
GENERATOR.
(Application filed May 12, 1900.)
(No Model.) 2 Sheets—Sheet 2.

Witnesses

Inventor
Franz Windhausen Jr
by James L. Norris.
atty

UNITED STATES PATENT OFFICE.

FRANZ WINDHAUSEN, JR., OF BERLIN, GERMANY.

GENERATOR.

SPECIFICATION forming part of Letters Patent No. 670,829, dated March 26, 1901.

Application filed May 12, 1900. Serial No. 16,514. (No model.)

*To all whom it may concern:*

Be it known that I, FRANZ WINDHAUSEN, Jr., engineer, of 13 Kurfürstendamm, Berlin, in the German Empire, have invented an Improvement in Methods of Producing Motive Power from Exhaust-Steam, Waste Gases, and the Like; and I do hereby declare the nature of this invention and in what manner the same is to be performed to be particularly described and ascertained in and by the following statement, reference being had to the accompanying drawings and to the letters and figures marked thereon.

The object of this invention is the utilization of the heat present in the exhaust-steam from steam-engines, in warm waste water of all kinds, as well as in the gases given off from furnaces, and the turning to account of sources of heat of low temperature for producing motive power.

In ordinary steam-engines only sources of heat can be utilized the temperature of which is considerably higher than 100° centigrade, and the result of the slight efficiency of the steam-engine is that about five-sixths of the whole of the heat employed is necessary for converting the water into steam, which amount of heat hitherto has remained for the most part without being utilized as motive power in the exhaust-steam or in the water of condensation of the steam-engine. An attempt has been made to secure a greater efficiency in the steam-engine by the use of higher steam-pressure and therewith a higher temperature of the steam, since with higher temperatures the proportion of the total amount of heat utilized to the latent heat (which was almost entirely lost for working purposes) became more considerable. In recent times fifteen atmospheres (equal to 200° centigrade) has been reached, whereby the degree of efficiency of the steam-engine has been largely increased. It has also been tried to further increase the efficiency of the steam-engine by superheating the saturated steam. For the superheating of the latter the gases given off from the furnace have been employed, which still leave the superheater with a temperature of about 300°. The practical results of these efforts, nevertheless, have been very slight, as the steam was at very high degrees of temperature, and in consequence inconvenience was experienced in the working of the engines, so that in practical working pressures up to fifteen atmospheres (equal to 200° centigrade) and superheating to the extent of 60° to 70° beyond the "saturating" temperature—that is, with fifteen atmospheres—270° centigrade have been reached.

The object of this invention is to utilize as motive power, as far as possible, the energy of the heat present in the exhaust-steam and furnace-gases which has hitherto been lost for working purposes. To this end I utilize the large amount of heat present at a low temperature in exhaust-steam for the conversion into vapor of liquids with low boiling-point and high tension—for instance, anhydrous ammonia, ($NH_3$,) carbonic anhydrid, ($CO_2$,) and sulfurous anhydrid, ($SO_2$.) The vapors of such liquids possess high pressures, even at the low temperatures available in the exhaust-steam. For example, at +45° centigrade the tension of the saturated vapor of carbonic anhydrid equals one hundred atmospheres; of ammonia, equals 17.5 atmospheres; of sulfurous anhydrid, equals seven atmospheres. According to the present method the ammonia or other vapor thus formed by the exhaust-steam is superheated, preferably, by the gases from the furnace. With superheating up to 100° beyond the saturated temperature of, for example, +65° centigrade, corresponding to a pressure of the ammonia-vapor of twenty-nine atmospheres, the said vapor has only a temperature of +165° centigrade, so that the gases given off from the furnace can be very suitably utilized for this purpose, whereas, for example, steam of fifteen atmospheres with superheating up to the same point—viz., 100° beyond the saturated temperature, which, moreover, is seldom reached in front of the cylinder—has already a temperature of +300° centigrade. Hence the value of the superheating of the above-mentioned ammonia or other vapor, in which, notwithstanding high superheating, the temperature remains only moderate, is clearly shown. The advantage connected with the superheating of carbonic-acid vapor is especially great, as the coefficient of expansion of the carbonic acid according to recent experiments is so great that with superheating for about 130° centigrade the volume of the superheated vapor, with the pressure remaining the same, is doubled, so that, for example, a volume of gaseous carbonic acid at 45° centigrade and one hundred atmospheres attains by superheating a double volume even at +175° centigrade, while steam of fifteen atmospheres (equal to 200° centigrade) only attains a double volume as a consequence of superheating for about 240° centigrade. The temperature of this steam under the above supposition would be 200°+240°=440° centigrade—a temperature which is obviously not reached in practice. The superheated ammonia and other vapors pass into a working cylinder furnished with distributing-valves of any desired kind and expand therein at the sacrifice of their superheating and vaporous heat until their pressure and temperature correspond to that of the available water of condensation. The ammonia or other vapors enter a condenser, in which they give off their latent heat to the water of condensation, so as to become condensed themselves. The ammonia liquefied in this way then flows for subsequent cooling into a liquid-cooler, thence to a feed-pump for the purpose of being forced again into a feed-heater, and then into the vaporizer, in which the ammonia or other liquids are converted into vapor, the above cycle of operations being constantly repeated.

Some forms of machine and apparatus employed for carrying out the new method are shown in the accompanying drawings.

Figure 2:
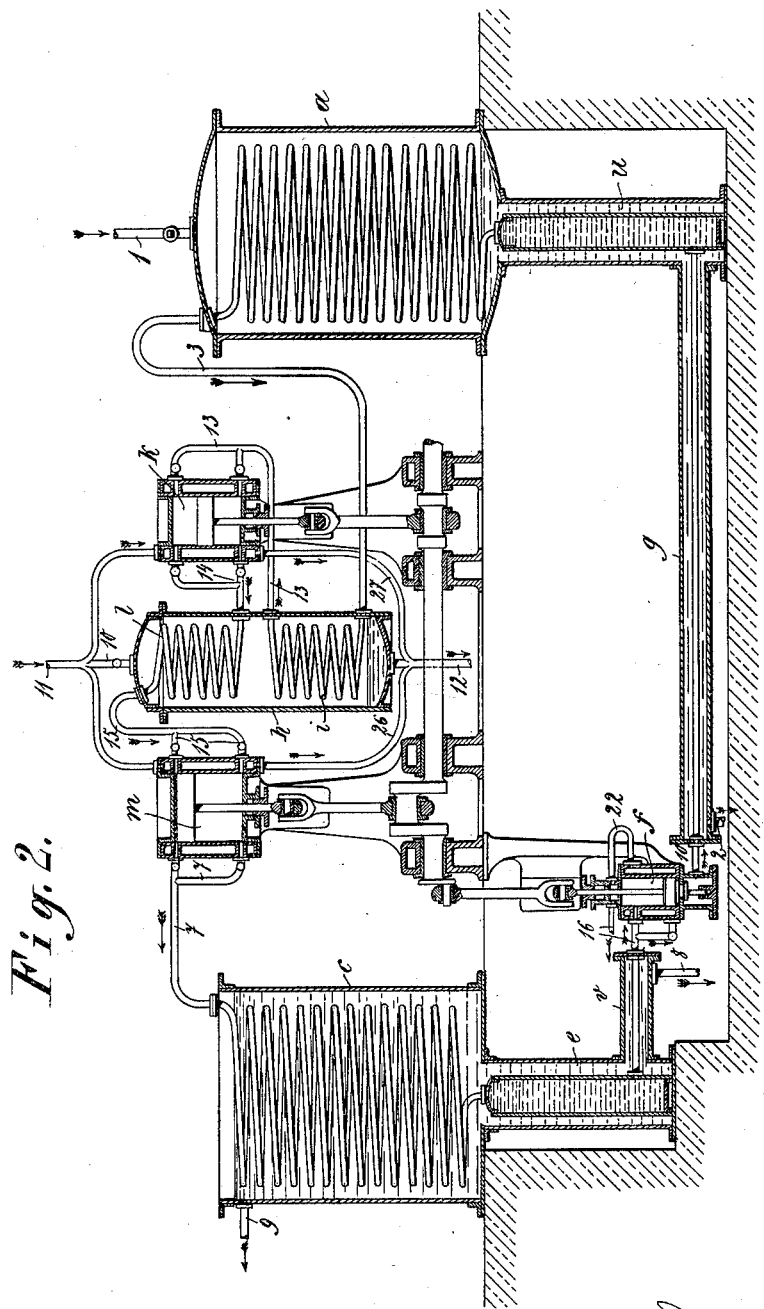

Figure 1 is a sectional diagram showing an arrangement of parts suitable for the practice of my invention. Fig. 2 is also a diagrammatic view of a varied form of Fig. 1, in which the vapors are twice subjected to superheating and expansion.

Referring first to Fig. 1, exhaust-steam, warm water, or other heating medium of low temperature flows in the pipe 1 in the direction indicated by the arrow to the vaporizer $a$, giving off its heat for evaporating the ammonia or other liquid contained in suitable hollow bodies—coils, for example—and becomes condensed on the pipes, and then after heating the liquid-collector $u$ reaches the feed-heater $g$, where it preliminarily heats the ammonia or other liquid forced by the pump $f$ into the vaporizer and passes through the pipe 2 to the open air or to an air-pump. The ammonia so heated and vaporized in the vaporizer passes through the pipe 3 into a superheater $d$, around which gases given off from the furnace circulate. In this apparatus, coil, or other arrangement the ammonia-vapors are superheated by the action of the furnace-gases, which enter at 4 and issue at 5. The high pressure and superheated vapors pass through the pipe 6 into a working cylinder $b$, furnished with distributing-valves, in order at the cost of their superheating and vaporous heat to expand and furnish motive power. The expanded vapors then pass through a pipe 7 into a condenser $c$, which may consist of a coil or pipe and in the interior of which is the ammonia or other liquid, while the exterior of the coil is surrounded by cooling-water at ordinary temperature. By means of the latter—for example, at +20° centigrade—the ammonia-vapors will be liquefied with 8.5 atmospheres, the carbonic-acid vapor with sixty atmospheres, and the vapor of the sulfurous acid with 3.2 atmospheres. This liquid collects in the reservoir $e$ and after cooling therein and subsequently cooling in the liquid-cooler $v$ flows into the feed-pump $f$. The cooling-water passes through the pipe 8 into the liquid-cooler $v$ and cools the liquid ammonia nearly to its own temperature and then after the cooling of the reservoir $e$ passes as a counter-current into the condenser $c$, there condensing the ammonia-vapor and passing out by way of a pipe 9 at or near the top of the condenser.

Fig. 2 represents an arrangement which is advantageously employed when exhaust-steam of comparatively high temperature—for instance, 70° to 80° centigrade—is available and it is desired to effect the most economical working. The fluid ammonia passes for the purpose of preliminary heating into the feed-heater $g$ and is then converted into vapor in the vaporizer $a$ by means of evaporating media entering through a pipe 1 at the top. The water formed by the expenditure of heat in vaporizing the ammonia then flows out of the feed-heater $g$ through a pipe 2 at the farther end of the feed-heater after the liquid ammonia has been heated. The high-pressure ammonia-vapors thus formed flow through the pipe 3 into a coil $i$, which is surrounded by steam, highly-heated water, or some other heated liquid, where they are heated and pass through the pipe 13 into a working cylinder $k$, furnished with distributing-valves. Here the vapors, now highly heated and under great tension, expand at the cost of their superheating and vaporous heat to the desired degree and then pass through the pipe 14 into a second coil $l$, in which they are again superheated. They then pass through a pipe 15 into a second working cylinder $m$ of larger capacity than the first and expand therein until they acquire the degree of tension and temperature corresponding to that of the available cooling-water, whereupon they pass through the pipe 7 into the condenser $c$ and are there condensed. After condensation they are further cooled in the reservoir $e$ and the liquid-cooler $v$ in order then to flow to the feed-pump $f$, which forces the now liquid ammonia through the preliminary heater $g$ into the vaporizer $a$, where it begins the circuit or cycle afresh. In this arrangement the expansion of the vapors in two cylinders of different sizes and the superheating of the vapors twice are provided for in order to effect as economical a working as possible. Further, an indirect superheating is employed, inasmuch as the ammonia-vapor is not directly superheated by the furnace-gases, but indirectly, the said gases first heating or evaporating water or other liquid in suitable apparatus, said liquid or vapors being then used to superheat the ammonia-vapors. The highly-heated water or other liquid or vapors of such liquids then pass through the pipe 11 into the superheater $h$, where it gives off its heat for superheating the ammonia-vapor and flows through the pipe 12 back into the heater. The effect of this indirect superheating is that the superheater $h\,i$ can be set up in immediate proximity to the machine, whereby only short pipe-conduits are necessary, loss of heat through the same being so avoided. Further, by means of the indirect superheating the possibility of superheating of the ammonia or other vapor to excess is prevented, and thereby any damage to the parts of the machine. Again, in this arrangement a jacket is provided for the cylinder; but the medium which circulates therein is not, as in steam-engines, the working fluid, but a fluid which has a higher boiling-point than the said working fluid. In engines using ammonia or other bodies the medium used in the indirect superheater $h$, (highly-heated water or steam,) which flows in through 24 and 25 and away through 26 and 27, can be advantageously employed. By means of this heating loss in condensation during the expansion is avoided as far as possible, and this jacket is especially effective, as there are great differences between the temperature in the cylinder and that in the jacket. It is obvious that the indirect superheating of the vapor and the jacket can also be employed with advantage in the single-cylinder arrangement according to Fig. 1, just as in the arrangement according to Fig. 2 direct superheating may be employed.

In the two arrangements illustrated the cooling-water flowing out of the condenser $c$ at 9, Fig. 2, can be advantageously utilized for the preliminary heating (in a special feed-heater) of the ammonia or other liquid forced by the pump to the vaporizer $a$, whereby there is an economy of heat available for the heating of the liquid up to the temperature of the vaporizer.

The arrangement and construction of the machine and apparatus illustrated in Figs. 1 and 2 are only diagrammatic and the cylinders may, for example, be arranged side by side horizontally, or vertically above one another, or in any other preferred manner. Furthermore, the apparatus in which the vapors, liquids, &c., circulate may be of any suitable form, coils being indicated in the drawings merely for the sake of clearness and simplicity. It is also obvious that on all the apparatus suitable fittings—such as safety valves, &c.—have to be arranged. Likewise, as far as practical, the counter-current principle is to be applied in all the apparatus.

An important element in the working of the apparatus is the action of the feed-pump $f$, by means of which the condensed vapors, such as ammonia, are drawn out of the cooler $v$. This pump must be so arranged that suction or the formation of vapor in front of the piston may be avoided as far as possible. For insuring this object the pump illustrated in Fig. 3 is employed. The cooled liquid ammonia or other body enters at 18 on the piston-rod side of the cylinder when the piston descends and flows when the piston ascends into the lower part of the cylinder through the circular suction-valve $p$ in the piston $o$, which valve is opened in consequence of the friction on the sides of the cylinder. When the piston descends, the suction-valve closes in consequence of the friction on the sides of the cylinder and the liquid ammonia is forced through the pipe 10 into the feed-heater $g$.

In order to destroy any heat which might enter or might be set up in consequence of friction or the like, whereby the cylinder might by filled with vapors instead of with liquid, an artificial means of cooling the pump-cylinder is provided. The cooling of the jacketed cylinder is effected by the circulation of cold water in its jacket 20 or by the entrance into the latter at 21 of liquid ammonia or the like, which is evaporated at low temperature and tension, and thereby considerably cools the sides of the cylinder. The vapors so formed pass out through the pipe 22 into a small compressor or into an absorbing apparatus, (not shown,) to which the ammonia escaping from the stuffing-box is also conducted. The ammonia after being absorbed by water or other suitable agent is eliminated from its solution by heat and passes to the condenser $c$, where it commences the cycle again.

Heretofore and prior to my invention it has been proposed to use exhaust-steam and waste furnace-heat to vaporize a fluid having a boiling-point lower than that of water. It has also been proposed to superheat and reheat exhaust-steam or other vapor and use the same again in a larger cylinder. I make no claim, therefore, to these methods, either separately or together, as being of my own invention.

Having now particularly described and ascertained the nature of my said invention and in what manner the same is to be performed, I declare that what I claim is—

1. The herein-described method for producing motive power, which consists in vaporizing by the heat of exhaust-steam and the like, liquids having a boiling-point below 0° centigrade, superheating the vapors thus produced, expanding the same in a working cylinder, superheating said vapors a second time, expanding the same after the second superheating in a larger working cylinder surrounded by a liquid or its vapors, said liquid having a boiling-point higher than said liquid from which the vapors are produced, and then cooling and condensing said vapors, substantially as herein described and for the purpose set forth.

2. The herein-described method for producing a motive power, which consists in vaporizing by exhaust-steam and the like, liquids having a boiling-point below 0° centigrade, heating water or other liquid by the waste gases from a steam-producing furnace, superheating the vapors by the heat of said water and other liquid or its vapors, expanding the said vapors in a working cylinder, and then cooling and condensing said vapors for a repetition of the operation, substantially as set forth.

3. The herein-described method for producing motive power, which consists in vaporizing by the heat of exhaust-steam and the like, liquids having a boiling-point below 0° centigrade, superheating the vapors thus produced, expanding the same in a working cylinder surrounded by a liquid having a boiling-point above 0° centigrade, superheating said vapors a second time, expanding the same after the second superheating in a larger working cylinder surrounded by a liquid or its vapors, said liquid having a boiling-point higher than said liquid from which the vapors are produced, and then cooling and condensing said vapors, substantially as herein described and for the purpose set forth.

In witness whereof I have hereunto set my hand in presence of two witnesses.

FRANZ WINDHAUSEN, Jr.

Witnesses:
  HENRY HASPER,
  WOLDEMAR HAUPT.